(12) United States Patent
Maeda

(10) Patent No.: US 10,800,955 B2
(45) Date of Patent: Oct. 13, 2020

(54) AQUEOUS SEALANT COMPOSITION FOR NONAQUEOUS ELECTROLYTE BATTERY

(71) Applicant: ZEON CORPORATION, Chiyoda-ku, Tokyo (JP)

(72) Inventor: Kouichirou Maeda, Tokyo (JP)

(73) Assignee: ZEON CORPORATION, Chiyoda-ku, Tokyo (JP)

( * ) Notice: Subject to any disclaimer, the term of this patent is extended or adjusted under 35 U.S.C. 154(b) by 6 days.

(21) Appl. No.: 16/090,651

(22) PCT Filed: Apr. 14, 2017

(86) PCT No.: PCT/JP2017/015378
§ 371 (c)(1),
(2) Date: Oct. 2, 2018

(87) PCT Pub. No.: WO2017/179723
PCT Pub. Date: Oct. 19, 2017

(65) Prior Publication Data
US 2019/0276716 A1  Sep. 12, 2019

(30) Foreign Application Priority Data
Apr. 15, 2016 (JP) ................. 2016-081720

(51) Int. Cl.
| | | |
|---|---|---|
| C09J 133/10 | (2006.01) | |
| C08F 220/18 | (2006.01) | |
| H01M 2/08 | (2006.01) | |
| H01M 2/02 | (2006.01) | |
| H01M 10/0525 | (2010.01) | |

(52) U.S. Cl.
CPC ........... *C09J 133/10* (2013.01); *C08F 220/18* (2013.01); *H01M 2/0277* (2013.01); *H01M 2/08* (2013.01); *H01M 10/0525* (2013.01); *C08F 220/1806* (2020.02)

(58) Field of Classification Search
CPC ........ C08F 2220/1841; C08F 2220/185; C08F 2220/1858; C08F 2220/1866; C08F 2220/1875; C08F 2220/1883; C08F 2220/1891; C08F 220/1808; C08F 220/1809; C08F 220/181; C08F 220/1812; H01M 2/08; C09J 133/10
See application file for complete search history.

(56) References Cited

U.S. PATENT DOCUMENTS

| | | | | |
|---|---|---|---|---|
| 4,367,323 A | * | 1/1983 | Kitamura | A61L 15/60 524/460 |
| 6,103,316 A | * | 8/2000 | Tran | C08F 290/044 427/505 |
| 6,492,019 B1 | * | 12/2002 | Shipston | C09J 7/35 428/355 EN |
| 2002/0034686 A1 | | 3/2002 | Yamakawa et al. | |
| 2015/0240131 A1 | | 8/2015 | Furuya et al. | |

FOREIGN PATENT DOCUMENTS

| | | |
|---|---|---|
| JP | S5384122 A | 7/1978 |
| JP | S5516352 A | 2/1980 |
| JP | S5530148 A | 3/1980 |
| JP | S59112565 A | 6/1984 |
| JP | S631706 B2 | 1/1988 |
| JP | H0696750 A | 4/1994 |
| JP | 3574276 B2 | 10/2004 |
| JP | 2006107935 A | 4/2006 |
| JP | 3956523 B2 | 8/2007 |
| JP | 2012150900 A | 8/2012 |
| WO | 2014054406 A1 | 4/2014 |

OTHER PUBLICATIONS

Oct. 16, 2018, International Preliminary Report on Patentability issued in the International Patent Application No. PCT/JP2017/015378.
Jul. 18, 2017, International Search Report issued in the International Patent Application No. PCT/JP2017/015378.
Aug. 1, 2019, the Extended European Search Report issued by the European Patent Office in the corresponding European Patent Application No. 17782536.1.

* cited by examiner

*Primary Examiner* — Jeffrey C Mullis
(74) *Attorney, Agent, or Firm* — Kenja IP Law PC

(57) ABSTRACT

Disclosed is an aqueous sealant composition for a nonaqueous electrolyte battery by which a sealant layer having excellent properties can be obtained. An aqueous sealant composition of the present disclosure comprises an acrylic polymer obtained by polymerizing a monomer composition comprising a compound represented by a general formula (I):

$$CH_2=CR^1COOR^2 \qquad (I),$$

where $R^1$ represents —H or —CH$_3$, and $R^2$ represents a cycloalkyl group or an alkyl group having 8 or more carbon atoms, in an amount of 80 mass % or more in an aqueous solvent.

5 Claims, No Drawings

AQUEOUS SEALANT COMPOSITION FOR NONAQUEOUS ELECTROLYTE BATTERY

TECHNICAL FIELD

The present disclosure relates to an aqueous sealant composition used for a nonaqueous electrolyte battery.

BACKGROUND

Lithium ion secondary batteries are widely used as power sources for small electronic devices such as notebook computers, mobile phones, tablet terminals, and the like. Further, in recent years, lithium ion secondary batteries are also used for automotive applications. As the usage range of lithium ion secondary batteries expands, demands for the performance and safety of lithium ion secondary batteries (hereinafter sometimes simply referred to as "batteries") are increasing. These batteries are usually repeatedly used by virtue of charge and discharge operations. However, due to repeated charge and discharge, sometimes volume fluctuation and heat generation occur in the electrodes, and the pressure inside the battery rises, such that the electrolytic solution leaks to the outside. In this case, not only the battery characteristics deteriorate but also problems such as heat generation due to the reduction of the electrolytic solution and corrosion of the device due to the leaked electrolytic solution occur. For example, when an electrolytic solution is used for a lithium ion secondary battery, since the electrolytic solution is organic and is extremely apt to be damaged by moisture, such a lithium ion secondary battery is required to have a high sealability to completely prevent moisture from entering the inside of the battery and completely prevent leakage of the electrolytic solution.

For example, a lithium ion secondary battery is housed in a metal container to seal its power generating element, and in order to prevent a short circuit between the positive electrode and the negative electrode, it is necessary to insulate the positive electrode terminal from the negative electrode terminal. Generally, a gasket made of an insulating material is used in the opening of the metal container containing the power generating element for insulation and sealing between the positive electrode and the negative electrode. As the insulating material, it is well known to use a resin insulating gasket (for example, refer to PTL 1).

In order to further strengthen sealing with such an insulating gasket, it is also proposed to use an insulating gasket and a sealant in combination (for example, refer to PTL 2 to 4). In this technique, the sealability between the insulating gasket and the metal container is enhanced by applying a sealant to the insulating gasket or the metal container and then attaching the insulating gasket to the metal container.

Examples of such a sealant include pitch-based materials such as coal tar, asphalt and the like, and materials obtained by adding a polymer as a modifier to a pitch-based material (for example, refer to PTL 5). In addition to pitch-based materials, a butyl rubber (for example, refer to PTL 6), a diene rubber having a predetermined weight-average molecular weight (for example, refer to PTL 7), and a block polymer containing a diene monomer (for example, refer to PTL 8) are also proposed.

Incidentally, in recent years, the influence of volatile organic compounds (VOC) on the environment has become a problem. The aforementioned sealants are used as a sealant composition dissolved or dispersed in an organic solvent, which is a VOC. Therefore, a sealant composition not using VOC is required.

PTL 9 proposes an aqueous sealant composition, however, the performance thereof required for a sealant is insufficient. For example, the strength of the sealant layer formed by the aqueous sealant composition is insufficient compared with a sealant layer obtained by a sealant composition using an organic solvent. In addition, PTL 10 proposes an aqueous sealant composition not using VOC, however, it is intended for a battery using an aqueous electrolyte solution, and no consideration has been given to a nonaqueous electrolyte battery.

CITATION LIST

Patent Literature

PTL 1: JPS 53-84122 A
PTL 2: JPS 55-30148 A
PTL 3: JPS 55-16352 A
PTL 4: JPS 59-112565 A
PTL 5: JPH 06-96750 A
PTL 6: WO 2014/054406 A1
PTL 7: JP 3574276 B2
PTL 8: JP 3956523 B2
PTL 9: JPS 63-1706 B2
PTL 10: JP 2006-107935 A

SUMMARY

Technical Problem

An objective of the present disclosure is to provide an aqueous sealant composition for a nonaqueous electrolyte battery by which a sealant layer having excellent properties can be obtained.

Solution to Problem

The inventor conducted a diligent investigation, and through this investigation, the inventor discovered that the objective set forth above can be achieved through use of a polymer obtained from a monomer composition comprising a specific compound in a predetermined amount or more, and thereby completed the present disclosure.

Specifically, the present disclosure provides the following.

(1) An aqueous sealant composition for a nonaqueous electrolyte battery, comprising an acrylic polymer obtained by polymerizing a monomer composition comprising a compound represented by a general formula (I):

$$CH_2=CR^1COOR^2 \qquad (I),$$

where $R^1$ represents —H or —$CH_3$, and $R^2$ represents a cycloalkyl group or an alkyl group having 8 or more carbon atoms, in an amount of 80 mass % or more in an aqueous solvent.

(2) The aqueous sealant composition for a nonaqueous electrolyte battery according to (1), comprising: in terms of solid content, the acrylic polymer in an amount of 70 mass % or more and 95 mass % or less, and a water-soluble polymer in an amount of 0.1 mass % or more and 30 mass % or less; and a total solid content concentration of 5 mass % or more and 70 mass % or less.

(3) The aqueous sealant composition for a nonaqueous electrolyte battery according to (2), wherein the water-soluble polymer comprises at least one of polyvinyl alcohol and polyvinyl pyrrolidone.

(4) The aqueous sealant composition for a nonaqueous electrolyte battery according to (2) or (3), wherein the water-soluble polymer has a 4 mass % aqueous solution viscosity of 4 mPa×s or more and 500 mPa×s or less.

Advantageous Effect

According to the presently disclosed aqueous sealant composition for a nonaqueous electrolyte battery, a sealant layer having excellent properties can be obtained.

DETAILED DESCRIPTION

The following describes an aqueous sealant composition for a nonaqueous electrolyte battery according to the present disclosure. The presently disclosed aqueous sealant composition for a nonaqueous electrolyte battery (hereinafter referred to also as "aqueous sealant composition") comprises an acrylic polymer obtained by polymerizing a monomer composition comprising a compound represented by a general formula (I):

$$CH_2=CR^1COOR^2 \quad (I),$$

where $R^1$ represents —H or —$CH_3$, and $R^2$ represents a cycloalkyl group or an alkyl group having 8 or more carbon atoms, in an amount of 80 mass % or more in an aqueous solvent.

By applying the presently disclosed aqueous sealant composition for a nonaqueous electrolyte battery to a metal container containing a power generating element and/or to an insulating gasket to form a sealant layer and then attaching the insulating gasket to the metal container, the sealability between the insulating gasket and the metal container can be enhanced.

(Acrylic Polymer)

The acrylic polymer comprised in the presently disclosed aqueous sealant composition is obtained by polymerizing a monomer composition comprising a compound represented by a general formula (I):

$$CH_2=CR^1COOR^2 \quad (I),$$

where $R^1$ represents —H or —$CH_3$, and $R^2$ represents a cycloalkyl group or an alkyl group having 8 or more carbon atoms, in an amount of 80 mass % or more, and preferably in an amount of 85 mass % or more in an aqueous solvent.

Examples of compounds represented by the general formula (I) include (meth)acrylic acid alkyl esters such as 2-ethylhexyl (meth)acrylate, isooctyl (meth)acrylate, isobornyl (meth)acrylate, isodecyl (meth)acrylate, lauryl (meth)acrylate, stearyl (meth)acrylate and tridecyl (meth)acrylate, and the like.

As used herein, the term "(meth)acrylic" means "acrylic" and "methacrylic".

These (meth)acrylic acid alkyl esters may be used alone or in combination of two or more thereof. Of these, it is preferable to use at least one of 2-ethylhexyl (meth)acrylate and lauryl (meth)acrylate, and more preferable to use both of 2-ethylhexyl (meth)acrylate and lauryl (meth)acrylate.

In addition, the monomer composition may comprise a monomer copolymerizable with the compound represented by the general formula (I). Examples of monomers copolymerizable with the compound represented by the general formula (I) include cyano group-containing vinyl monomers, amino group-containing vinyl monomers, pyridyl group-containing vinyl monomers, alkoxyl group-containing vinyl monomers, aromatic vinyl monomers, and the like. Of these examples, cyano group-containing vinyl monomers and aromatic vinyl monomers are preferable, and aromatic vinyl monomers are more preferable. These monomers copolymerizable with the compound (an acrylic monomer) represented by the above general formula (I) may be used alone or in combination of two or more thereof.

Examples of aromatic vinyl monomers include styrene, α-methyl styrene, 2-methyl styrene, 3-methyl styrene, 4-methyl styrene, 2,4-diisopropyl styrene, 2,4-dimethyl styrene, 4-t-butyl styrene, 5-t-butyl-2-methyl styrene, N,N-dimethylaminoethyl styrene, N,N-diethylaminoethylstyrene, and the like. Of these examples, styrene and α-methylstyrene are particularly preferable. These aromatic vinyl monomers may be used alone or in combination of two or more thereof.

The content percentage of the monomer copolymerizable with the compound represented by the general formula (I) in the monomer composition is 0 mass % or more and 20 mass % or less, and preferably 0 mass % or more and 15 mass % or less.

The acrylic polymer may be a random copolymer or a block copolymer, and is preferably a random copolymer. Further, in the present disclosure, the acrylic polymer may be an acrylic homopolymer or an acrylic copolymer, and these examples may be used alone or in combination of two or more thereof.

The glass-transition temperature (Tg) of the acrylic polymer used in the present disclosure is preferably less than −30° C., more preferably less than −40° C., and further preferably less than −60° C. When the glass-transition temperature is within the above range, it is possible to suppress a phenomenon that the glass-transition temperature is excessively high, such that the sealing performance of the sealant layer obtained from the aqueous sealant composition deteriorates at low temperature.

The molecular weight of the acrylic polymer used in the present disclosure is not particularly limited and may be appropriately selected according to the purpose of use. However, the weight-average molecular weight thereof as measured by gel permeation chromatography (in terms of polystyrene, using a toluene eluent) is usually 500 or more and 5,000,000 or less, and preferably 1,000 or more and 1,000,000 or less.

The acrylic polymer can be produced, for example, by polymerizing a monomer composition containing a compound represented by the above general formula (I) and as necessary, a monomer copolymerizable with the compound represented by the general formula (I) in an aqueous solvent. The acrylic polymer usually has monomer units derived from the monomers contained in the monomer composition at the same ratio as that of the monomers in the monomer composition.

Here, the aqueous solvent also functions as a dispersion medium capable of dispersing the acrylic polymer. It is also considerable to use water as a main solvent and mix an aqueous solvent other than water therewith, as long as the effect of the present disclosure is not impaired and the dispersion state of the acrylic polymer is secured.

Polymerization of the acrylic polymer is carried out in an aqueous solvent. By conducting polymerization in an aqueous solvent, the acrylic polymer can be obtained in a latex state in which it is dispersed in water as it is. Therefore, redispersion treatment becomes unnecessary, and the latex can be used as it is for producing a presently disclosed aqueous sealant composition comprising the acrylic polymer, such that the production efficiency can be enhanced. No specific limitations are placed on the polymerization method, and from the viewpoint of production efficiency such as ease of obtaining a high molecular weight substance, an emulsion polymerization method is preferable. The emulsion polymerization can be carried out by a standard method. In the emulsion polymerization, commonly used polymerization auxiliary materials such as an emulsifier, a polymerization initiator, a molecular weight modifier, a chain transfer agent and the like can be used.

As the emulsifier, any emulsifiers can be used as long as a desired polymer can be obtained. Examples of emulsifiers include anionic surfactants, nonionic surfactants, cationic surfactants, and amphoteric surfactants. Of these examples, anionic surfactants such as an alkylbenzene sulfonate, an aliphatic sulfonate, a higher alcohol sulfuric ester salt, an α-olefin sulfonate, an alkyl ether sulfate ester salt, and the like can be preferably used.

More particularly, examples of anionic surfactants include sodium dodecylbenzenesulfonate, sodium lauryl sulfate, sodium dodecyl diphenyl ether disulfonate, sodium succinate dialkyl ester sulfonate, and the like. Further, for example, a reactive emulsifier having an unsaturated bond may be used. Of these examples, sodium dodecylbenzenesulfonate is preferable. Note that these emulsifiers may be used alone or in combination of two or more thereof in any proportion.

The amount of the emulsifier can be freely determined as long as a desired polymer can be obtained, and is preferably 0.5 parts by mass or more, more preferably 1 part by mass or more, and preferably 10 parts by mass or less, more preferably 5 parts by mass or less, per 100 parts by mass of the monomer composition.

As the polymerization initiator used in the polymerization reaction, any polymerization initiators can be used as long as a desired polymer can be obtained. Examples of polymerization initiators include sodium persulfate (NaPS), ammonium persulfate (APS), potassium persulfate (KPS), and the like.

In the polymerization, seed particles may be used to perform seed polymerization. The polymerization conditions may also be selected freely in accordance with the polymerization method, type of polymerization initiator, and the like.

Through the emulsion polymerization, an aqueous dispersion containing the acrylic polymer can be obtained. The solid content concentration of the aqueous dispersion is preferably 20 mass % or more, more preferably 30 mass % or more, and preferably 70 mass % or less, more preferably 65 mass % or less.

The aqueous dispersion containing the acrylic polymer may contain a component other than the acrylic polymer. The component other than the acrylic polymer is not particularly limited as long as it does not impair the sealing performance of the presently disclosed aqueous sealant composition, and for example, an aqueous dispersion of a modified polyolefin, an aqueous dispersion of a poly (meth) acrylic acid alkyl ester, or the like can be used.

(Aqueous Sealant Composition)

The presently disclosed aqueous sealant composition comprises the aforementioned acrylic polymer preferably in an amount of 70 mass % or more and 95 mass % or less, more preferably in an amount of 80 mass % or more and 95 mass % or less, further preferably in an amount of 85 mass % or more and 95 mass % or less, and particularly preferably in an amount of 85 mass % or more and 90 mass % or less, per 100 mass % of the solid content. When the content percentage of the acrylic polymer in the aqueous sealant composition is within the above range, it is possible to suppress a phenomenon that the content percentage of the acrylic polymer is excessively high, such that the wettability of the aqueous sealant composition decreases. It is also possible to suppress a phenomenon that the content percentage of the acrylic polymer is excessively low, such that the flexibility of the sealant layer obtained by using the aqueous sealant composition decreases, that is, the sealing performance deteriorates.

Further, the presently disclosed aqueous sealant composition preferably comprises a water-soluble polymer in addition to the aforementioned acrylic polymer. Examples of water-soluble polymers include polyvinyl alcohol, polyacrylic acid, polystyrene sulfonic acid, polyvinyl pyrrolidone, and the like. Of these examples, polyvinyl alcohol and polyvinyl pyrrolidone are preferable, and polyvinyl alcohol having a saponification rate of 98 mol % or more, which is said to be fully saponified type, is particularly preferable.

The above water-soluble polymers may be used alone or in combination of two or more thereof in any proportion.

The water-soluble polymer preferably has a 4 mass % aqueous solution viscosity of 4 mPa×s or more and 500 mPa×s or less. Note that the viscosity in the present disclosure is a viscosity value measured at a liquid temperature of 20° C., using a Brookfield viscometer (B type viscometer).

The content percentage of the water-soluble polymer in the aqueous sealant composition is preferably 0.1 mass % or more, more preferably 1 mass % or more, further preferably 3 mass % or more, particularly preferably 10 mass % or more, and preferably 30 mass % or less, more preferably 20 mass % or less, further preferably 15 mass % or less, per 100 mass % of the solid content.

Further, the solid content concentration of the presently disclosed aqueous sealant composition is preferably 5 mass % or more, more preferably 20 mass % or more, further preferably 30 mass % or more, particularly 40 mass % or more, and preferably 70 mass % or less, more preferably 60 mass % or less, further preferably 50 mass % or less, particularly 43 mass % or less. When the solid content concentration is within this range, it is possible to suppress a phenomenon that the solid content concentration is excessively high, making it difficult to obtain a sealant layer having a desired film thickness. It is also possible to suppress a phenomenon that the solid content concentration is excessively low, such that a longer drying time is required at the time of formation of a sealant layer. The solid content concentration of the aqueous sealant composition can be adjusted by a known method such as concentration using a rotary evaporator.

Furthermore, if necessary, additives such as colorants and the like may be added to the presently disclosed aqueous sealant composition. A colorant that can be added is preferably one that does not react with an electrolytic solution and does not dissolve in an electrolytic solution, and examples thereof include various organic and inorganic pigments. Of these examples, carbon black, particularly carbon black having a particle diameter of 0.1 μm or less, such as furnace black, channel black and the like, is preferable. When adding such a colorant, it is necessary to dissolve or disperse it sufficiently uniformly in the composition, and when using a granulated colorant or a colorant having an aggregated structure, it is better to disperse it with a ball mill, a sand mill, ultrasonic waves, or the like. The amount of such additives such as colorants to be added may be an arbitrary amount as necessary, and is usually 0.01 mass % or more and 20 mass % or less, preferably 0.01 mass % or more and 5 mass % or less, and more preferably 0.02 mass % or more and 3 mass % or less, with respect to the amount of the acrylic polymer (100 mass %). When the amount of additives is within this range, it is possible to suppress a phenomenon that the amount of additives is excessively high, such that the flexibility of the sealant layer decreases, resulting in cracking.

The method for producing the presently disclosed aqueous sealant composition is not particularly limited, and examples thereof include a method of adding other components such as a water-soluble polymer and additives to an aqueous dispersion containing an acrylic polymer; a method of mixing an aqueous dispersion containing an acrylic polymer and an aqueous solution of a water-soluble polymer that were respectively prepared, and then adding other components such as additives thereto; and the like.

The following describes the present disclosure through examples. However, the present disclosure is not limited to these examples. Note that "parts" and "%" in the present examples are by mass unless otherwise specified. Wettability, peel strength, flexibility (bending tolerance) and sealability were evaluated as follows in the examples and comparative examples.

(Wettability)

Each aqueous sealant composition obtained in the examples and comparative examples was applied to a film made of polypropylene using a doctor blade having a width of 100 mm and a gap of 100 μm and was then dried on a hot plate at 80° C. Thereafter, the width of each dried coating film was measured with a vernier caliper, and the ratio thereof to the width of the doctor blade was calculated. A case in which the coating film width ratio was 95% or more was given an evaluation of "good", and a case in which the coating film width ratio was less than 95% was given an evaluation of "poor". The results are listed in Table 1. When the coating film width ratio is 95% or more, it can be judged that the wettability is good.

(Peel Strength)

The peel strength of each test piece obtained in the examples and comparative examples was measured by a 90° peeling method in accordance with JIS Z0237. More particularly, an aluminum tape having a width of 18 mm with an adhesive was laminated to each test piece that is ribbon-like, and the peel strength was measured at a tensile rate of 50 mm/min at 23° C. using a tensile tester. The results are listed in Table 1. Note that the greater the peel strength, the better the strength of the sealant layer.

(Flexibility (Bending Tolerance))

Each test piece obtained in the examples and comparative examples was immersed in methanol at −30° C. for 1 hour and was folded with the sealant layer on the outside immediately after being taken out from the methanol. Then, the bent portion was observed as to whether cracking, peeling or the like is present. A case in which no cracking, peeling and the like was observed was given an evaluation of "good", and a case in which cracking, peeling or the like was observed was given an evaluation of "poor". The results are listed in Table 1.

(Sealability)

A film having a size of 1 cm×1 cm was produced from each aqueous sealant composition obtained in the examples and comparative examples, and the mass $M_0$ was measured. Then, each film was immersed in a simulated electrolytic solution (a mixed solution of ethylene carbonate (EC) and diethyl carbonate (DEC) (EC/DEC=1/2: volume ratio) in which 1.0 mol/L of $LiPF_6$ was dissolved) at 60° C. for 72 hours, and the mass $M_1$ was measured. Thereafter, the degree of swelling was calculated in accordance with $(M_1-M_0)/M_0 \times 100(\%)$. Note that the smaller the degree of swelling, the better the sealability. The results are listed in Table 1.

EXAMPLES

Example 1

(Polymerization of Acrylic Polymer)

300 parts of deionized water, 85 parts of 2-ethylhexyl methacrylate, 15 parts of lauryl methacrylate, and as an emulsifier, 2 parts of sodium dodecylbenzenesulfonate were added to a 10 liter autoclave equipped with a stirrer, and after sufficient stirring, as a polymerization initiator, 0.8 part of potassium peroxide was added, and then polymerization was carried out for 60 hours under stirring at 80° C. Polymerization was subsequently terminated through addition of 100 parts of methanol. After termination of polymerization, the polymerization liquid was cooled to room temperature and then removed from the autoclave. The particle diameter of the obtained polymer (a volume-average particle diameter measured by a particle diameter measuring machine Coulter LS230 manufactured by Coulter Inc.) was 0.28 μm.

(Aqueous Sealant Composition)

The polymerization liquid obtained as described above was concentrated by heating under reduced pressure at 60° C. using a rotary evaporator to produce an aqueous dispersion having a solid content concentration of 50 mass % containing the acrylic polymer.

Then, to 95 parts by mass of solid content of the obtained aqueous dispersion of the acrylic polymer, 5 parts by mass of solid content of a 10 mass % aqueous solution of polyvinyl alcohol (PVOH) (polyvinyl alcohol JF17 manufactured by JAPAN VAM & POVAL CO., LTD., viscosity of a 4 mass % aqueous solution: 4.5 mPa×s, saponification rate: 98 mol %) was added as a water-soluble polymer, and thereafter the above was concentrated by heating under reduced pressure at 60° C. using a rotary evaporator to obtain an aqueous sealant composition. The total content concentration of the aqueous sealant composition was 45 mass %.

(Test Piece)

The obtained aqueous sealant composition was cast on an aluminum foil (thickness: 20 μm) with a doctor blade having a gap of 200 μm and was then subjected to heat drying at 80° C. for 20 minutes to form a film-like sealant layer to obtain a test piece.

Example 2

Polymerization of the acrylic polymer was carried out in the same manner as in Example 1 except that the monomer used in the polymerization of the acrylic polymer was changed to 90 parts of 2-ethylhexyl methacrylate and 10 parts of lauryl methacrylate.

The polymerization liquid obtained as described above was concentrated by heating under reduced pressure at 60°

C. using a rotary evaporator to produce an aqueous dispersion having a solid content concentration of 50 mass % containing the acrylic polymer.

Then, to 85 parts by mass of solid content of the obtained aqueous dispersion of the acrylic polymer, 15 parts by mass of solid content of a 10 mass % aqueous solution of PVOH (polyvinyl alcohol JF17 manufactured by JAPAN VAM & POVAL CO., LTD., viscosity of a 4 mass % aqueous solution: 4.5 mPa×s, saponification rate: 98 mol %) was added, and thereafter the above was concentrated by heating under reduced pressure at 60° C. using a rotary evaporator to obtain an aqueous sealant composition. The total solid content concentration of the aqueous sealant composition was 42 mass %.

A test piece was produced in the same manner as in Example 1 except that the above aqueous sealant composition was used.

Example 3

Polymerization of the acrylic polymer was carried out in the same manner as in Example 1 except that the monomer used in the polymerization of the acrylic polymer was changed to 60 parts of 2-ethylhexyl methacrylate and 40 parts of lauryl methacrylate.

The polymerization liquid obtained as described above was concentrated by heating under reduced pressure at 60° C. using a rotary evaporator to produce an aqueous dispersion having a solid content concentration of 50 mass % containing the acrylic polymer.

Then, to 88 parts by mass of solid content of the obtained aqueous dispersion of the acrylic polymer, 12 parts by mass of solid content of a 10 mass % aqueous solution of PVOH (polyvinyl alcohol JF17 manufactured by JAPAN VAM & POVAL CO., LTD., viscosity of a 4 mass % aqueous solution: 4.5 mPa×s, saponification rate: 98 mol %) was added, and thereafter the above was concentrated by heating under reduced pressure at 60° C. using a rotary evaporator to obtain an aqueous sealant composition. The total solid content concentration of the aqueous sealant composition was 40 mass %.

A test piece was produced in the same manner as in Example 1 except that the above aqueous sealant composition was used.

Comparative Example 1

Polymerization of the acrylic polymer was carried out in the same manner as in Example 1 except that the monomer used in the polymerization of the acrylic polymer was changed to 50 parts of 2-ethylhexyl methacrylate and 50 parts of ethyl acrylate.

The polymerization liquid obtained as described above was concentrated by heating under reduced pressure at 60° C. using a rotary evaporator to produce an aqueous dispersion having a solid content concentration of 50 mass % containing the acrylic polymer.

Then, to 90 parts by mass of solid content of the obtained aqueous dispersion of the acrylic polymer, 10 parts by mass of solid content of a 10 mass % aqueous solution of PVOH (polyvinyl alcohol JF17 manufactured by JAPAN VAM & POVAL CO., LTD., viscosity of a 4 mass % aqueous solution: 4.5 mPa×s, saponification rate: 98 mol %) was added, and thereafter the above was concentrated by heating under reduced pressure at 60° C. using a rotary evaporator to obtain an aqueous sealant composition having a solid content concentration of 50 mass %.

A test piece was produced in the same manner as in Example 1 except that the above aqueous sealant composition was used.

Comparative Example 2

Polymerization of the acrylic polymer was carried out in the same manner as in Example 1 except that the monomer used in the polymerization of the acrylic polymer was changed to 60 parts of 2-ethylhexyl methacrylate and 40 parts of styrene.

The polymerization liquid obtained as described above was concentrated by heating under reduced pressure at 60° C. using a rotary evaporator to produce an aqueous dispersion containing the acrylic polymer. Then, without adding PVOH to the obtained aqueous dispersion of the acrylic polymer, the aqueous dispersion was concentrated by heating under reduced pressure at 60° C. using a rotary evaporator to obtain an aqueous sealant composition. The total solid content concentration of the aqueous sealant composition was 50 mass %.

A test piece was produced in the same manner as in Example 1 except that the above aqueous sealant composition was used. Note that it was not possible to evaluate the peel strength because a film having a uniform sealant layer at a level at which peel strength can be measured was not obtained due to poor wettability of the aqueous sealant composition to the aluminum foil.

TABLE 1

| | | Example 1 | Example 2 | Example 3 | Comparative Example 1 | Comparative Example 2 |
|---|---|---|---|---|---|---|
| Monomer composition | 2-ethylhexyl methacrylate (mass %) | 85 | 90 | 60 | 50 | 60 |
| | Lauryl methacrylate (mass %) | 15 | 10 | 40 | — | — |
| | Ethyl acrylate (mass %) | — | — | — | 50 | — |
| | Styrene (mass %) | — | — | — | — | 40 |
| Aqueous sealant composition | Acrylic polymer (mass %/solid content 100 mass %) | 95 | 85 | 88 | 90 | 100 |
| | Water-soluble polymer (mass %/solid content 100 mass %) | 5 | 15 | 12 | 10 | 0 |
| | Solid content concentration (mass %) | 45 | 42 | 40 | 50 | 50 |
| Evaluation items | Wettability | Good | Good | Good | Good | Poor |
| | Peel strength (N/18 mm) | 28 | 35 | 38 | 27 | — |
| | Flexibility (bending tolerance) | Good | Good | Good | Good | Poor |
| | Sealability (electrolyte swelling degree) | 1 mass %> | 1 mass %> | 1 mass %> | 28 mass % | 7 mass % |

As can be seen from Table 1, each aqueous sealant composition for a nonaqueous electrolyte battery comprising an acrylic polymer obtained by polymerizing a monomer composition comprising a compound represented by the general formula (I):

$$CH_2=CR^1COOR^2 \quad (I),$$

where $R^1$ represents —H or —$CH_3$, and $R^2$ represents a cycloalkyl group or an alkyl group having 8 or more carbon atoms, in an amount of 80 mass % or more in an aqueous solvent was excellent in wettability, and the peel strength, flexibility and sealability of the film obtained from the aqueous sealant composition were satisfactory.

The invention claimed is:

1. A nonaqueous electrolyte battery comprising an insulating gasket and a metal container containing a power generating element, wherein an attaching portion of the insulating gasket and the metal container are sealed by a sealant layer, the sealant layer is formed by an aqueous sealant composition comprising an acrylic polymer obtained by polymerizing a monomer composition comprising a compound represented by a general formula (I):

$$CH_2=CR^1COOR^2 \quad (I),$$

where $R^1$ represents —H or —$CH_3$, and $R^2$ represents a cycloalkyl group or an alkyl group having 8 or more carbon atoms, in an amount of 80 mass % or more in an aqueous solvent.

2. The nonaqueous electrolyte battery according to claim 1, wherein the aqueous sealant composition comprises:
   in terms of solid content, the acrylic polymer in an amount of 70 mass % or more and 95 mass % or less, and a water-soluble polymer in an amount of 0.1 mass % or more and 30 mass % or less; and
   a total solid content concentration of the aqueous sealant composition is 5 mass % or more and 70 mass % or less.

3. The nonaqueous electrolyte battery according to claim 2, wherein the water-soluble polymer comprises at least one of polyvinyl alcohol and polyvinyl pyrrolidone.

4. The nonaqueous electrolyte battery according to claim 2, wherein the water-soluble polymer has a 4 mass % aqueous solution viscosity of 4 mPaxs or more and 500 mPaxs or less.

5. The nonaqueous electrolyte battery according to claim 3, wherein the water-soluble polymer has a 4 mass % aqueous solution viscosity of 4 mPaxs or more and 500 mPaxs or less.

* * * * *